Feb. 16, 1926. 1,573,172
W. J. LAFFEY
ADJUSTABLE PLURAL DECK TRUCK
Filed July 22, 1925 4 Sheets-Sheet 2
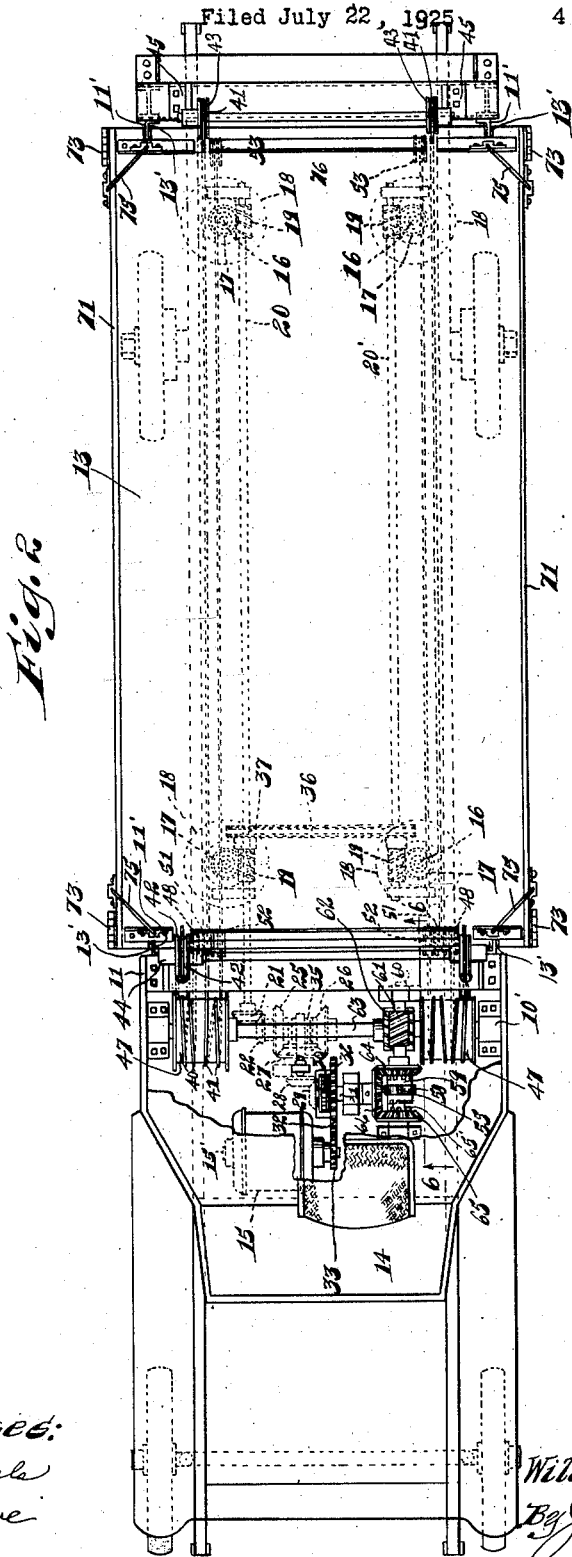

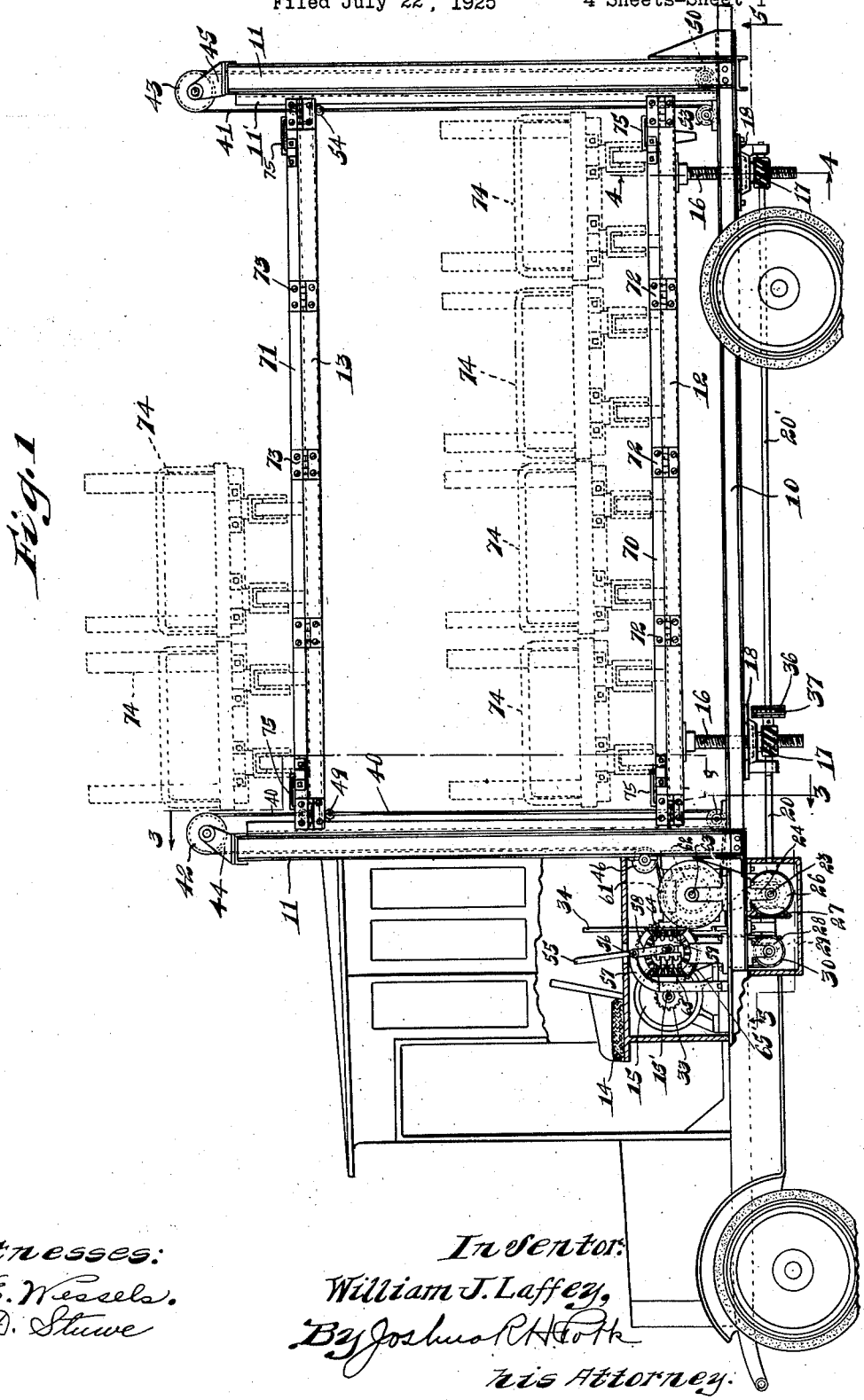

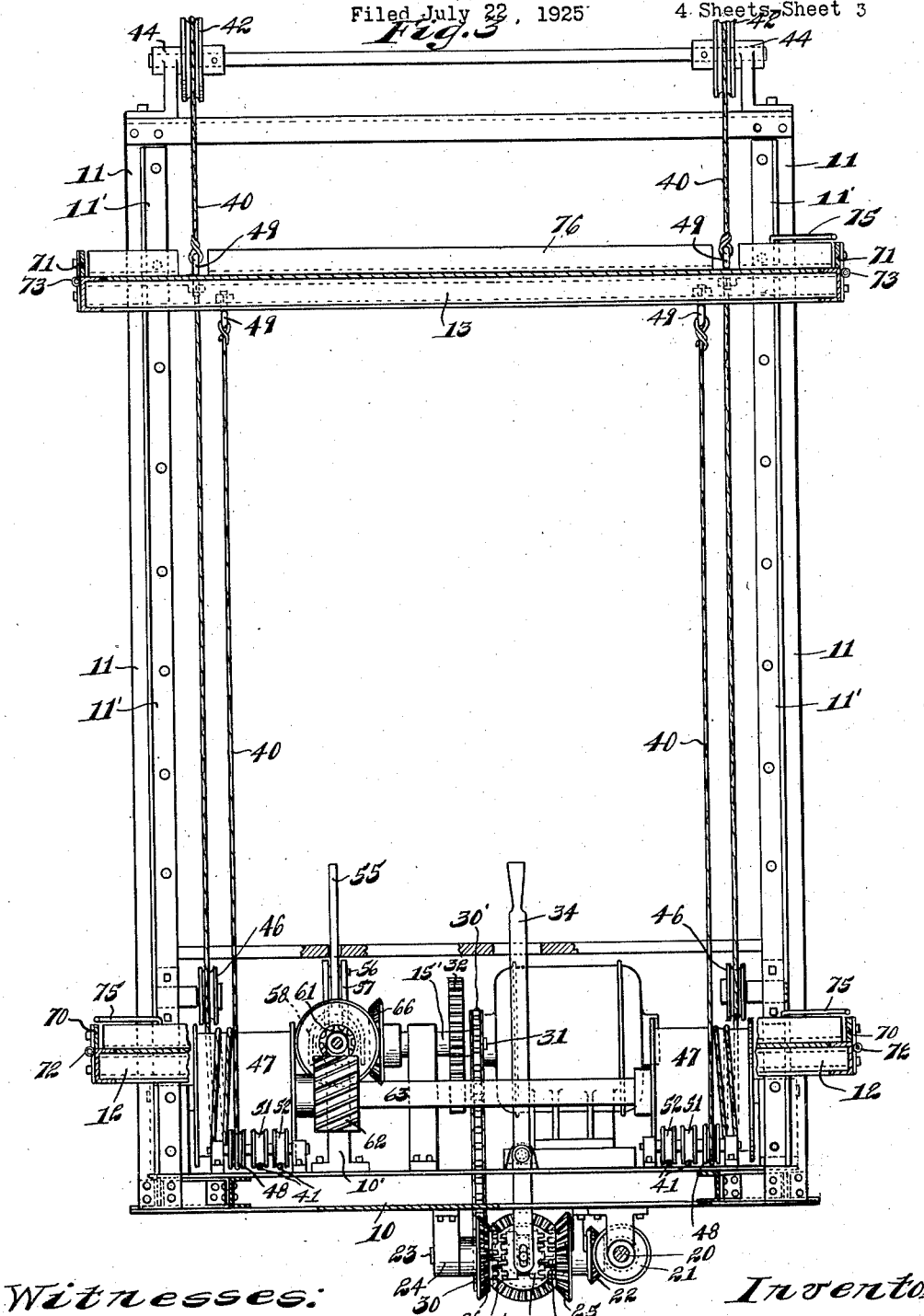

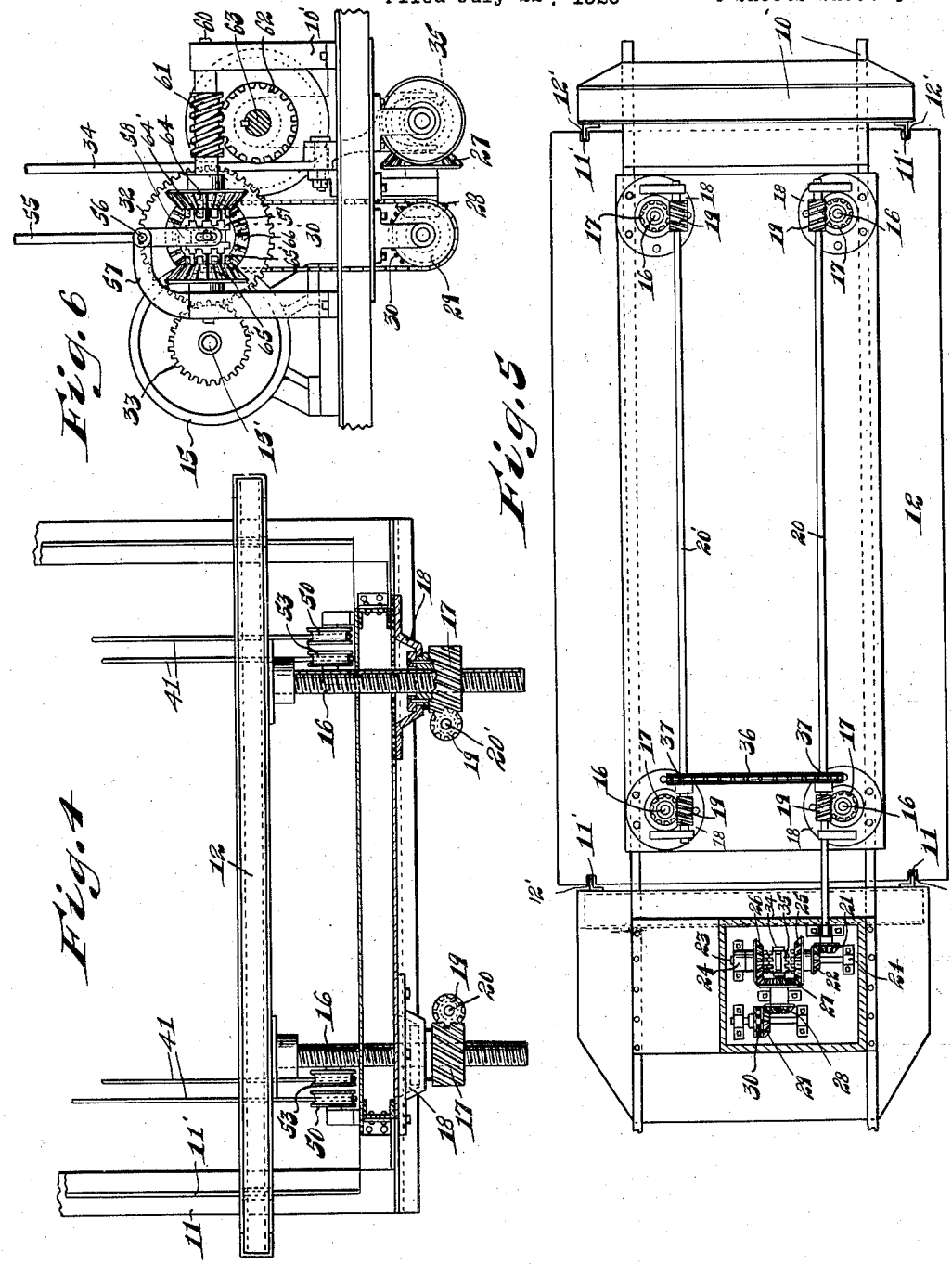

Patented Feb. 16, 1926.

1,573,172

UNITED STATES PATENT OFFICE.

WILLIAM J. LAFFEY, OF CHICAGO, ILLINOIS

ADJUSTABLE PLURAL-DECK TRUCK.

Application filed July 22, 1925. Serial No. 45,179.

*To all whom it may concern;*

Be it known that I, WILLIAM J. LAFFEY, a citizen of the United States, and a resident of the city of Chicago, county of Cook, and State of Illinois, have invented certain new and useful Improvements in Adjustable Plural-Deck Trucks, of which the following is a specification.

My invention pertains to an adjustable plural-deck truck, and has for its object to provide a truck or vehicle with a plurality of decks or platforms which are independently adjustable. Another object is to provide such a truck or vehicle which is provided with superposed decks or platforms, each of which is adjustable vertically and independently of the other. And another object is to provide a motor truck with a plurality of superposed decks or platforms which are particularly adapted to carry freight-house trucks and which are adjustable vertically to be placed level with the freight-house platform for conveniently receiving and discharging the freight-house trucks onto each one of said decks or platforms. And a further object is to provide a plural-deck motor truck with operating means for conveniently raising or lowering either of the truck decks by the motor power of the truck and by operating lever means from the driver's seat.

Other objects will appear hereinafter.

The invention consists in the combinations and arrangements of parts hereinafter described and claimed.

The invention will be best understood by reference to the accompanying drawings, forming a part of this specification, and in which, Fig. 1 is a side elevational view of my invention;

Fig. 2 is a plan view thereof;

Figs. 3 and 4 are enlarged vertical sectional views taken respectively on lines 3—3 and 4—4 of Fig. 1;

Fig. 5 is a horizontal sectional view taken on line 5—5 of Fig. 1; and

Fig. 6 is an enlarged vertical sectional view taken on line 6—6 of Fig. 2.

The form of construction illustrated comprises the main truck frame or chassis 10 with uprights or guide beams 11 rising from the corners of the main frame and having angle irons or members 11′ extending inwardly therefrom.

In the drawings I have shown two platforms 12 and 13 provided with slotted ends 12′ and 13′ to engage the angle members 11′ on the uprights 11 and move vertically thereon. Although two decks or platforms are shown, any number of decks may be used by lengthening the uprights sufficiently.

Any suitable means may be used for operating the platforms independently, and preferably by suitable lever means within reach of the driver's seat 14, and by making use of the driving motor 15 of the truck. The means for operating the lower floor 12 preferably comprises threaded shafts 16 fastened to said floor and operatively by a threaded gear 17 rotatable on said shaft and supported against vertical movement in a bracket 18. The gear 17 is operated by means of a worm 19 engaging teeth on the exterior of gear 17, said worm being fastened to a shaft 20 driven by a bevelled pinion 21 which is actuated by a bevelled pinion 22 fastened on an interior rotatable shaft 23 mounted in brackets 24 beneath the truck frame. A pair of bevelled gears 25 and 26 are rotatably mounted on said shaft, and are constantly driven in reverse direction by a bevelled gear 27 connected with a bevelled pinion 28 which is driven by a pinion 29 provided with a sprocket wheel 30 driven by a suitable chain and a sprocket gear 30′, fixed on a shaft 31 driven by a spur gear 32 which is driven by a gear 33 fastened on the shaft 15′ of motor 15. A lever 34, adjacent the driver's seat, operates a double-jaw clutch 35 to move it into engagement either with the jaws 25′ of bevelled gear 25 or with the jaws 26′ of bevelled gear 26, and thereby rotate said clutch in the desired direction with either of the constantly rotating bevelled gears 25 or 26, so as to rotate the shaft 23 and pinion 22 in the desired direction, thereby to operate the shaft 20 and worm 19 with worm gear 17 in the desired direction in order to operate the threaded shaft 16 upwardly or downwardly thereby and thus raise or lower the platform 12 to bring it level with the freight-house floor or platform, and so forth. The shaft 20 is provided with two similar worms 19 in order to operate both threaded shaft 16 at one side of the motor truck simultaneously, and a similar shaft 20′ with worms 19 thereon is mounted at the other side of the truck for engaging similar worm gears 17 to operate on the threaded shaft 16 on said side of the truck. A chain 36 operates on similar sprocket gears 37 on the shafts 20 and 20', so as to make the operation of the worm gears 17 simultaneous.

The means for operating or moving the upper deck or platform 13 vertically on the uprights 11 and angle members 11', preferably comprises upper cables 40 at the front of the platform and cables 41 at the rear of the platform running upwardly over pulleys 42 and 43 mounted in brackets 44 and 45 fastened to uprights 11 at the front and at the rear of the truck respectively. Said cables 40 extend downwardly over pulleys 46 at the front of the truck and are wound several times around drums 47 and continue over a further pulley 48 mounted on the main frame 10 and then continue upwardly to be attached to a suitable eye or hook 49 at the bottom of deck 13. The cables 41 at the rear of the truck likewise extend downwardly over pulleys 50 on frame 10 and thence forwardly around pulleys 51 mounted adjacent the front of said frame, and are then wound a number of times around said drums 47 and then pass beneath a pulley 52 adjacent pulleys 51, said cable thence passes rearwardly beneath a pulley 53 at the rear of the truck and extends upwardly therefrom to an eye or member 54 fastened beneath the upper deck 13.

The means for operating the cables to move the upper floor vertically comprises a lever 55 pivoted at 56 on a bracket 57, and said lever is provided with forks 58 engaging over a clutch 59 which is slidably keyed to a shaft 60 provided with a worm 61 engaging a worm gear 62 on shaft 63 upon which the drums 47 are fastened, said shaft being supported in brackets 64 on frame 10, as indicated. A pair of bevelled gears 64 and 65 are rotatably mounted on shaft 60 and are provided with clutch elements or teeth 64' and 65' engaged by the teeth on clutch 59 which is movable into engagement with either one or the other of said bevelled gears 64 and 65. These bevelled gears are constantly rotated by a bevelled gear 66 fastened on shaft 31, which shaft is driven by the gears 32 and 33. By moving the lever 55 either forwardly or backwardly the clutch 59 is moved into engagement with either bevelled gear 64 or 65 to move the upper deck 13 in the direction desired.

A strip 70 is mounted on each side of the lower deck, and a similar strip 71 is mounted on each side of the upper deck, preferably by means of suitable hinges 72 and 73, so that the strips may be folded downwardly when the freight-house trucks 74, as indicated in Fig. 1, are moved onto or off the decks or platforms. These strips are held in upright position for retaining the freight-house trucks 74 on the decks, in any suitable manner, and preferably by means of releasable hooks 75 at the corners of the platforms, as indicated. Suitable stop members 76 are also provided at the rear of each platform, in order to prevent the freight-house trucks 74 from accidentally moving off the platforms. With a construction as above disclosed the upper deck 13 may be moved to the proper level of the freight house floor or platform, and the freight-house truck 74 may then be loaded thereon after lowering the strip 71 and thereafter the strips are fastened in their upward position and the deck 13 is sufficiently raised with said trucks; whereupon the lower deck or platform 12 is moved to the level of the freight-house floor or platform, and additional freight-house trucks 74 are placed on said lower deck 12 after lowering the strips 72, whereupon the strips 72 are raised and fastened. The upper deck 13 may then be dropped down if desired, into close proximity of the frames of said freight-house trucks 74. This construction provides a plurality of decks or platforms on the truck, instead of the one employed, and these decks or platforms are readily adjustable to the proper level of the freight-house floor. If desired, the upper deck 13 may be lowered sufficiently to rest upon the frames of the freight-house trucks 74, and these decks with the freight-house trucks mounted thereon substantially answer the same purpose as the truck body on the usual motor truck, and this construction at the same time provides convenient means for loading and unloading freight-house material by simply running the small freight-house trucks with the material thereon onto the motor truck decks and off from said decks in the course of business.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A motor truck comprising superposed decks adapted to carry freight-house trucks, means for adjusting the upper deck level with the freight-house platform to receive freight-house trucks on said deck, said means being arranged for elevating said deck with said trucks thereon sufficiently to receive freight-house trucks on the succeeding deck, and lever operated means for selectively moving either of said decks by the power of the truck motor.

2. A motor truck comprising a main frame with uprights thereon, a plurality of decks mounted to move along said uprights, means for adjusting and retaining each of the said decks vertically in position, and means for actuating each of said adjusting means by the power of the driving motor of said truck.

3. A motor truck comprising a main frame with uprights thereon, a plurality of decks movably mounted on said uprights, cable means with a drum and pulleys for moving and retaining one of said decks in position, and means including a lever for operating said cable means and drum to move said deck by the power of the motor.

4. A motor truck comprising a main frame, a plurality of superposed decks movably mounted on said frame, means including threaded shafts and gear means for elevating one of said decks, and means including a lever for operating said shafts and gear means by the power of the driving motor of said truck.

5. A motor truck comprising a main frame with uprights thereon, a pair of decks mounted to move vertically along said uprights, means including cables and a drum for moving and retaining the upper deck vertically in side uprights, means including threaded shafts and gear means for moving and retaining the lower deck vertically in said uprights, and lever means conveniently operable from the driver's seat for operating said moving means by the power of the driving motor of said truck.

6. A motor truck comprising a plurality of superposed decks adapted for carrying freight-house trucks, means for adjusting each of said decks vertically to a level with a freight-house platform for receiving freight-house trucks on either deck, and hinged bars on said decks which are swingable upwards to retain said freight-house trucks on said decks.

7. A motor truck comprising a main frame with uprights thereon, a plurality of superposed decks being arranged for carrying freight-house trucks thereon, means for adjusting and retaining each of said decks vertically in position at the level of the freight-house platform for receiving freight-house trucks, and swingable means on said decks for retaining freight-house trucks thereon.

In testimony whereof I have signed my name to this specification.

WILLIAM J. LAFFEY.